US012013952B1

(12) United States Patent
    Sanchez Rola (10) Patent No.: US 12,013,952 B1
(45) Date of Patent: Jun. 18, 2024

(54) SYSTEMS AND METHODS FOR PROTECTING USER DATA PRIVACY AGAINST THE USE OF FAKE FIRST-PARTY DOMAINS BY HIDDEN WEB TRACKERS

(71) Applicant: GEN DIGITAL INC., Tempe, AZ (US)

(72) Inventor: Iskander Sanchez Rola, Antibes (FR)

(73) Assignee: GEN DIGITAL INC., Tempe, AZ (US)

( * ) Notice: Subject to any disclaimer, the term of this patent is extended or adjusted under 35 U.S.C. 154(b) by 198 days.

(21) Appl. No.: 17/645,495

(22) Filed: Dec. 22, 2021

(51) Int. Cl.
    *G06F 21/60* (2013.01)
(52) U.S. Cl.
    CPC ...... *G06F 21/60* (2013.01); *G06F 2221/2119* (2013.01)
(58) Field of Classification Search
    CPC .................... G06F 21/60; G06F 2221/2119
    See application file for complete search history.

(56) References Cited

U.S. PATENT DOCUMENTS

| 10,686,826 B1 * | 6/2020 | Goutal | G06F 18/2178 |
| 11,496,510 B1 * | 11/2022 | Orhan | H04L 63/1483 |
| 2008/0034404 A1 * | 2/2008 | Pereira | H04L 63/12 726/2 |
| 2017/0041333 A1 * | 2/2017 | Mahjoub | H04L 61/4511 |
| 2017/0180402 A1 * | 6/2017 | Finnig | G06F 21/563 |
| 2018/0152471 A1 * | 5/2018 | Jakobsson | H04L 63/1425 |
| 2019/0068638 A1 * | 2/2019 | Bartik | H04L 63/1483 |
| 2019/0190931 A1 * | 6/2019 | Levin | H04L 63/20 |
| 2021/0084071 A1 * | 3/2021 | Mandrychenko | H04L 63/20 |

\* cited by examiner

*Primary Examiner* — Saleh Najjar
*Assistant Examiner* — Devin E Almeida
(74) *Attorney, Agent, or Firm* — Greenberg Traurig, LLP (57) ABSTRACT

The disclosed computer-implemented method for protecting user data privacy against the use of fake first-party domains by hidden web trackers may include (i) identifying a group of subdomains associated with one or more websites, (ii) comparing an Internet Protocol (IP) address range for each of the subdomains, (iii) determining, based on the comparison, that an IP address range for a target subdomain is potentially utilized by a hidden web tracker as a fake first-party subdomain in the websites, (iv) detecting similarities between any scripts loaded by websites associated with the target subdomain and any functions performed by the scripts, and (v) perform a security action that protects against utilizing fake domains for evading web browser tracking protection by identifying the target subdomain as the fake first-party subdomain based on the detected similarities. Various other methods, systems, and computer-readable media are also disclosed.

20 Claims, 7 Drawing Sheets

SYSTEMS AND METHODS FOR PROTECTING USER DATA PRIVACY AGAINST THE USE OF FAKE FIRST-PARTY DOMAINS BY HIDDEN WEB TRACKERS

BACKGROUND

Internet browsing activities, including accessing websites over enterprise and home computer networks, often include web tracking during browsing sessions that may compromise user privacy by maintaining and/or utilizing private user data. For example, content being viewed on a website by a user may include a website tracker configured to store identifying information (e.g., a user's browsing history or contact information) in a browser cookie or as a fingerprint on a local storage device so that when the same content is loaded by a different website, the website tracker may continue serving the user with additional content without the user's consent.

Traditional methods for addressing unwanted web tracking include utilizing enhanced web browsers or browser extensions with anti-tracking features configured to block network requests or browser cookies utilized by web trackers that are detectable via the identification of third-party website domains. As a response to anti-tracking, web tracking companies may utilize evasion techniques that hide previously detectable trackers by disguising third-party domains as first-party domains that are not detected by traditional methods.

SUMMARY

As will be described in greater detail below, the present disclosure describes various systems and methods for protecting user data privacy against the use of fake first-party domains by hidden web trackers.

In one example, a method for protecting user data privacy against the use of fake first-party domains by hidden web trackers may include (i) identifying, by one or more computing devices, a group of subdomains associated with one or more websites, (ii) comparing, by the one or more computing devices, an Internet Protocol (IP) address range for each of the subdomains, (iii) determining, by the one or more computing devices and based on the comparison, that an IP address range for a target subdomain is potentially utilized by a hidden web tracker as a fake first-party subdomain in the websites, (iv) detecting, by the one or more computing devices, similarities between any scripts loaded by websites associated with the target subdomain and any functions performed by the scripts, and (v) performing, by the one or more computing devices, a security action that protects against utilizing fake domains for evading web browser tracking protection by identifying the target subdomain as the fake first-party subdomain based on the detected similarities.

In some examples, the subdomains associated with the websites may be identified by (i) retrieving a hypertext markup language (HTML) document that renders a currently displayed web page on the websites and (ii) identifying the subdomains within HTML code in the HTML document. In some embodiments, the IP address range for each of the subdomains may be compared by (i) comparing an IP address range for each of a group of web pages on the websites to identify a target IP address range associated with one of the subdomains that is unrelated to other IP address ranges associated with the other subdomains, (ii) comparing the target IP address range to IP address ranges associated with subdomains for other websites to identify a matching IP address range, and (iii) comparing the target IP address range to an IP address range utilized by a known third-party web tracker to identify the matching IP address range. In some examples, the IP address ranges associated with the subdomains for the other websites are unrelated to an IP address range for a primary domain associated with each of the other websites.

In some embodiments, the similarities between the scripts loaded by the websites associated with the target subdomain and the functions performed by the scripts may be detected by (i) comparing the scripts loaded by the websites by utilizing fuzzy hashing to determine a similarity score, (ii) comparing tracking functions and application programming interface (API) calls performed by each of the scripts, and (iii) comparing parameters and identifiers included in script execution requests. In some examples, the scripts may be executed by web trackers.

In some examples, the security action that protects against utilizing the fake domains for evading the web browser tracking protection by identifying the target subdomain as the fake first-party subdomain based on the detected similarities, may be performed by (i) determining a high similarity score between a script loaded from a website associated with the target subdomain and scripts from websites associated with other subdomains and (ii) determining a similarity between tracking functions and API calls performed by each of the scripts. Alternatively, the aforementioned security action may be performed by (i) determining a high similarity score between a script loaded from a website associated with the target subdomain and scripts from websites associated with other subdomains and (ii) determining a similarity between parameters and identifiers included in script execution requests from a website associated with the target subdomain and script execution requests from other websites associated with other subdomains. Alternatively, the security action may be performed by (i) determining a similarity between tracking functions and API calls performed by each of the scripts and (ii) determining a similarity between parameters and identifiers included in script execution requests from a website associated with the target subdomain and script execution requests from other websites associated with other subdomains. Alternatively, the security action may be performed by (i) determining a high similarity score between a script loaded from a website associated with the target subdomain and scripts from websites associated with other subdomains, (ii) determining a similarity between tracking functions and API calls performed by each of the scripts, and (iii) determining a similarity between parameters and identifiers included in script execution requests from a website associated with the target subdomain and script execution requests from other websites associated with other subdomains.

In one embodiment, a system for protecting user data privacy against the use of fake first-party domains by hidden web trackers may include at least one physical processor and physical memory comprising computer-executable instructions and one or more modules that, when executed by the physical processor, cause the physical processor to (i) identify, by an identification module, a group of subdomains associated with one or more websites, (ii) compare, by a comparison module, an IP address range for each of the subdomains, (iii) determine, by a determining module and based on the comparison, that an IP address range for a target subdomain is potentially utilized by a hidden web tracker as a fake first-party subdomain in the websites, (iv) detect, by a detection module, similarities between any scripts loaded by websites associated with the target subdomain and any functions performed by the scripts, and (v) perform, by a security module, a security action that protects against utilizing fake domains for evading web browser tracking protection by identifying the target subdomain as the fake first-party subdomain based on the detected similarities.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify a group of subdomains associated with one or more websites, (ii) compare an IP address range for each of the subdomains, (iii) determine, based on the comparison, that an IP address range for a target subdomain is potentially utilized by a hidden web tracker as a fake first-party subdomain in the websites, (iv) detect similarities between any scripts loaded by websites associated with the target subdomain and any functions performed by the scripts, and (v) perform a security action that protects against utilizing fake domains for evading web browser tracking protection by identifying the target subdomain as the fake first-party subdomain based on the detected similarities.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for protecting user data privacy against the use of fake first-party domains by hidden web trackers. As will be described in greater detail herein, by performing an analysis utilizing a series of checks to identify anomalous IP address ranges associated with first party subdomains in websites, the systems and methods described herein may dynamically infer the objectives of any scripts initiated from suspicious subdomains by analyzing their APIs and function calls to determine third-party web tracking, thereby enabling the identification of subdomains hiding behind first party domains (i.e., subdomains using fake domain names that are the same as those utilized by the websites themselves) intended to evade web browser tracking protections against third-party tracking domains.

In addition, the systems and methods described herein may improve computer network security by identifying website trackers running scripts intended to obtain private data (e.g., web browser cookies containing private user data) during web browsing sessions, thereby protecting against potential privacy attacks (e.g., phishing attacks) by malicious actors utilizing these website trackers.

Figure 1:
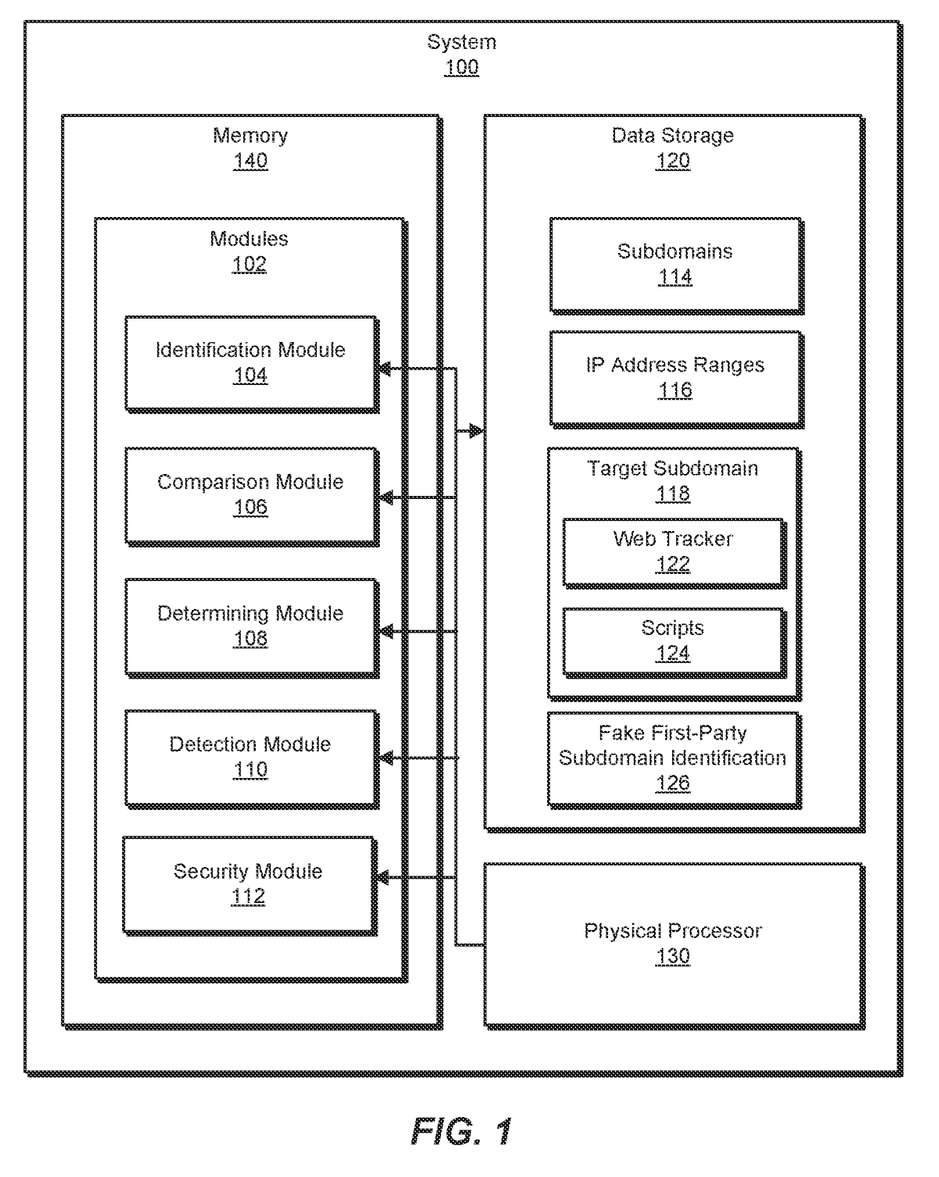
FIG. 1 is a block diagram of an example system for protecting user data privacy against the use of fake first-party domains by hidden web trackers.
Figure 2:
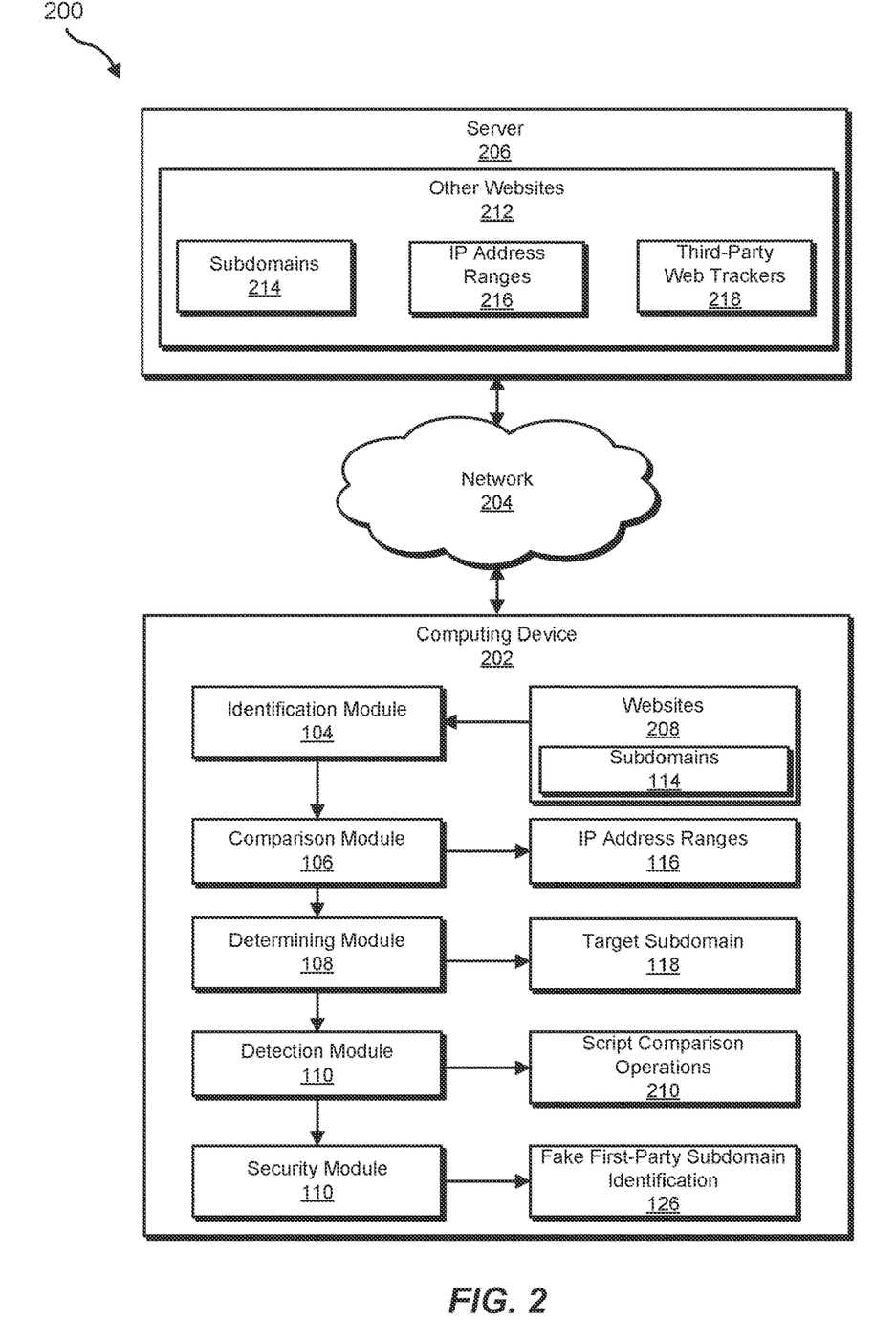
FIG. 2 is a block diagram of an additional example system for protecting user data privacy against the use of fake first-party domains by hidden web trackers.

The following will provide, with reference to FIGS. 1-2, detailed descriptions of example systems for protecting user data privacy against the use of fake first party domains by hidden web trackers. Detailed descriptions of corresponding computer-implemented methods will also be provided in connection with FIGS. 3-5. In addition, detailed descriptions of an example computing system and network architecture capable of implementing one or more of the embodiments described herein will be provided in connection with FIGS. 6 and 7, respectively.

FIG. 1 is a block diagram of an example system 100 for protecting user data privacy against the use of fake first-party domains by hidden web trackers. As illustrated in this figure, example system 100 may include one or more modules 102 for performing one or more tasks. As will be explained in greater detail below, modules 102 may include an identification module 104 that identifies subdomains 114 associated with one or more websites. Example system 100 may additionally include a comparison module 106 that compares an IP address range 116 for each of subdomains 114. Example system 100 may also include a determining module 108 that determines that an IP address range 116 for a target subdomain 118 is potentially utilized by a hidden web tracker (e.g., web tracker 122) as a first-party subdomain. Example system 100 may additionally include a detection module 110 that detects similarities between any scripts 124 loaded by websites associated with target subdomain 118 and any functions performed by scripts 124. Example system 100 may additionally include a security module 112 that performs a security action that protects against utilizing fake domains for evading web browser tracking protection by identifying target subdomain 118 as a fake first-party subdomain (e.g., via a fake first-party subdomain identification 126) based on the similarities detected by detection module 110. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate protecting user data privacy against the use of fake first-party domains by hidden web trackers. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include a data storage 120 for storing data. In one example, data storage 120 may store subdomains 114 and IP address ranges 116. Data storage 120 may also store target subdomain 118 (which may include web tracker 122 and scripts 124). Data storage 120 may further store fake first party subdomain identification 126.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to protect user data privacy against the use of fake first-party domains by hidden web trackers.

For example, identification module 104 may identify subdomains 114 associated with one or more websites 208.

Then, comparison module 106 may compare an IP address range 116 for each of subdomains 114 associated with websites 208 as well as subdomains 214 associated with other websites 212. Next, determining module 108 may determine, based on the comparison made by comparison module 106, that an IP address range 116 for a target subdomain 118 is potentially utilized by a hidden web tracker as a fake first-party domain in websites 208 based on IP address ranges 216 and known third-party web trackers 218. Then, detection module 110 may detect similarities (e.g., by performing script comparison operations 210) between any scripts loaded by websites 208 and or other websites 212 that ae associated with target subdomain 118 (as well as any functions performed by these scripts). Finally, security module 112 may perform a security action that protects against utilizing fake domains for evading web browser tracking protection by identifying target subdomain 118 as a fake first-party subdomain based on the similarities detected by detection module 110, by generating fake first-party subdomain identification 126 for a user.

Computing device 202 generally represents any type or form of computing device capable of reading computer-executable instructions. In some examples, computing device 202 may be an endpoint device running client-side security software including online privacy protection in connection with user web browsing sessions. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of servicing user website requests from one or more client devices as well as storing third-party web tracker data. In some examples, each of servers 206 may represent a plurality of servers that work and/or operate in conjunction with one another. Additional examples of servers 206 include, without limitation, security servers, application servers, web servers, storage servers, and/or database servers configured to run certain software applications and/or provide various security, web, storage, and/or database services.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
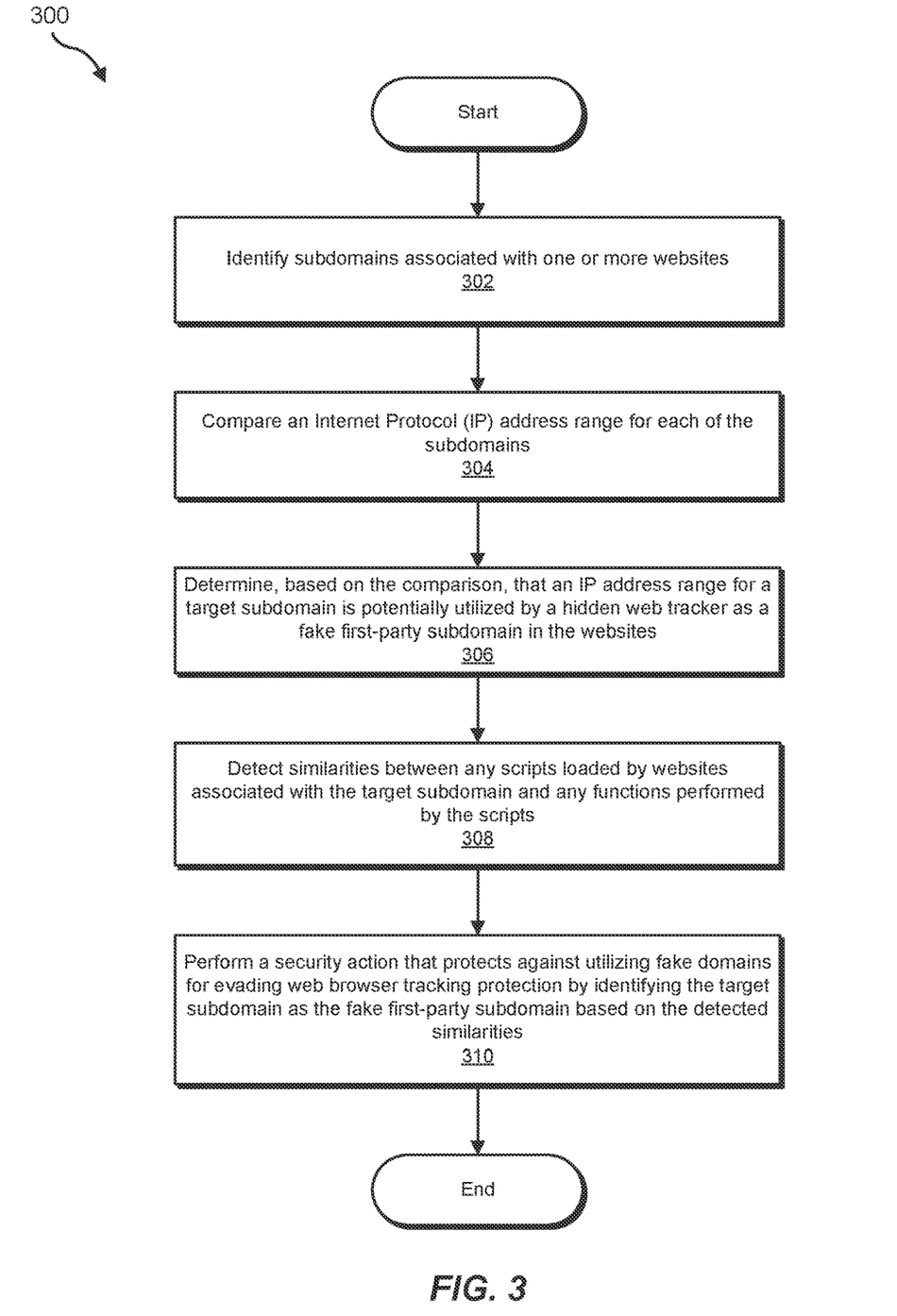
FIG. 3 is a flow diagram of an example method for protecting user data privacy against the use of fake first-party domains by hidden web trackers.

FIG. 3 is a flow diagram of an example computer-implemented method 300 for protecting user data privacy against the use of fake first-party domains by hidden web trackers. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may identify subdomains associated with one or more websites. For example, identification module 104 may, as part of computing device 202 in FIG. 2, identify a subdomain 114 associated with a website 208 displayed in a web browser.

The term "subdomain," as used herein, generally refers to any website domain in the domain name system (DNS) hierarchy that is part of another (i.e., main or primary) domain for that website. For example, a website may utilize "example.com" as a primary domain and "a.example.com" as a subdomain.

Identification module 104 may identify subdomains 114 in a variety of ways. In some embodiments, identification module 104 may access or retrieve an HTML document that renders a currently displayed web page on a website 208 and identify the subdomains for the website that are listed within the HTML code in the HTML document. For example, identification module 104 may identify the subdomains for the website "example.com" (i.e., the primary domain) as "a.example.com" and "c.example.com" in the HTML document representing the web page for "example.com."

At step 304, one or more of the systems described herein may compare the IP address ranges for each of the subdomains identified at step 302. For example, comparison module 106 may, as part of computing device 202 in FIG. 2, compare IP address ranges 116 for each of subdomains 114.

The term "IP address range," as used herein, generally refers to a grouping of unique numerical strings utilized by websites to identify the computing devices (e.g., servers) hosting website content that may be accessed by users over a network, such as the Internet. For example, a website having a group of web pages associated with multiple subdomains, may have an assigned IP address range of 184.51.71.01 to 184.51.71.25 which includes 184.51.71.22 for the primary domain "example.com" and 184.51.171.11 for the subdomain "c.example.com." Comparison module 106 may compare IP address ranges 116 in a variety of ways which will now be described with reference to FIG. 4.

Figure 4:
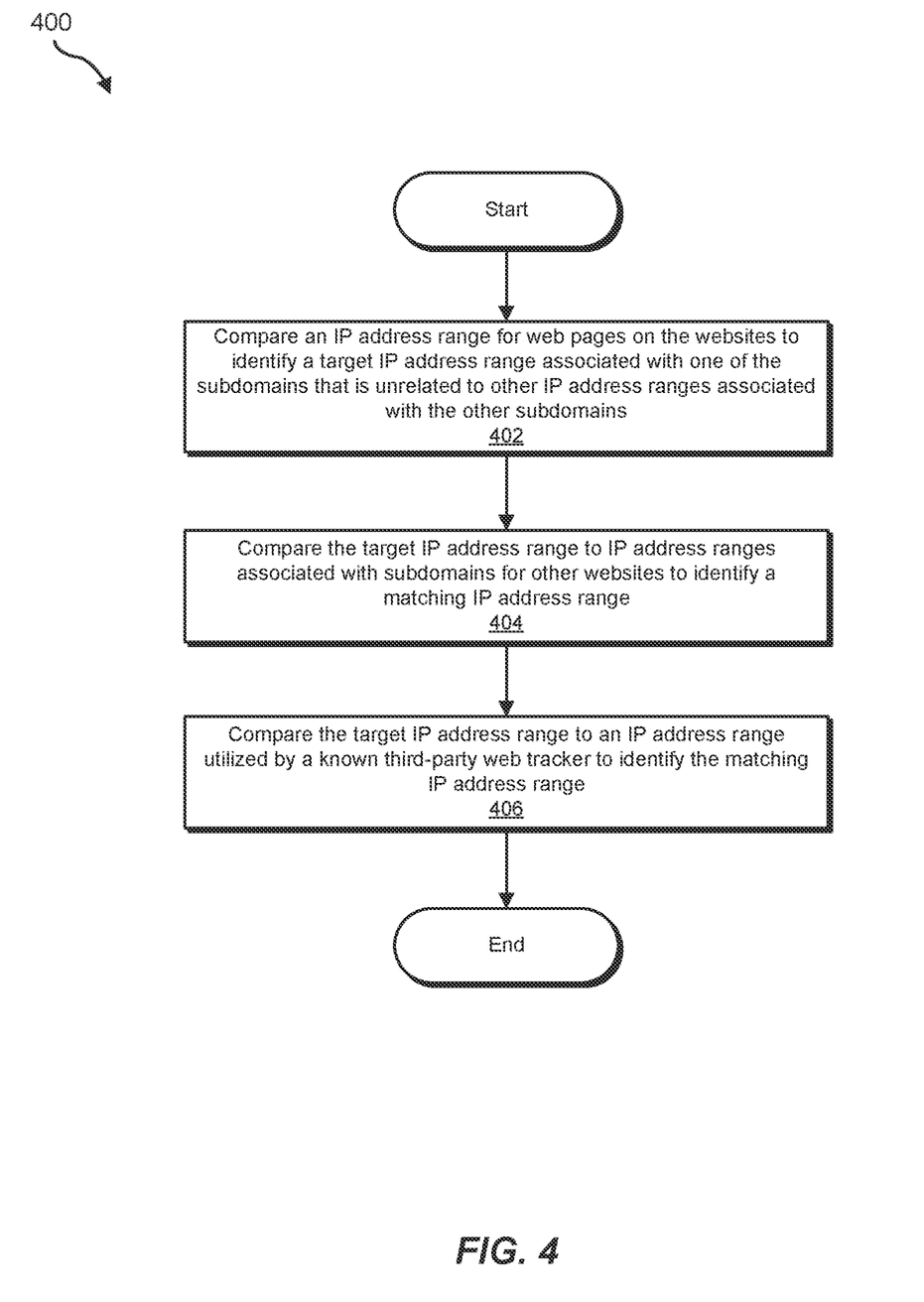
FIG. 4 is a flow diagram of an additional example method for protecting user data privacy against the use of fake first-party domains by hidden web trackers.

Turning now to FIG. 4, a flow diagram of an example computer-implemented method 400 for comparing IP address ranges in a system for protecting user data privacy against the use of fake first-party domains by hidden web trackers, will now be described. The steps shown in FIG. 4 may be performed by any suitable computer-executable code and/or computing system, including system 100 in FIG. 1, system 200 in FIG. 2, and/or variations or combinations of one or more of the same. In one example, each of the steps shown in FIG. 4 may represent an algorithm whose structure includes and/or is represented by multiple sub-steps, examples of which will be provided in greater detail below.

As illustrated in FIG. 4, at step 402 one or more of the systems described herein may compare an IP address range for web pages on a website to identify a target IP address range associated with one of the subdomains that is unrelated to other IP address ranges associated with the other subdomains. For example, comparison module 106 may, as part of computing device 202 in FIG. 2, compare an IP address range on a website 208 to identify a target IP address range associated with one subdomain 114 that is unrelated to other IP address ranges for the same subdomain 114.

In some embodiments, comparison module 106 may check each of a number of different subdomains 114 loaded on a website 208 in making the comparison. For example, a website 208 may utilize the primary domain "example.com" associated with IP address 184.51.171.22 for the main web page, the subdomain "a.example.com" associated with IP address 109.232.197.33 for a secondary web page, and the subdomain "c.example.com" associated with IP address 184.51.171.11 for another secondary web page. In this example, comparison module 106 may identify the IP address 109.232.197.33 for the subdomain "a.example.com" as the target IP address range since it is unrelated to the IP address range for the other two website subdomains (i.e., 184.51.171.22 and 184.51.171.11).

At step 404, one or more of the systems described herein may then compare the target IP address range identified at step 402 to IP address ranges associated with subdomains for other websites to identify a matching IP address range. For example, comparison module 106 may, as part of computing device 202 in FIG. 2, compare the target IP address range to IP address ranges 216 for other websites 212.

In some embodiments, comparison module 106 may make a comparison to determine if a specific IP address range (i.e., the target IP address range) is also used in other subdomains of other websites and is also unrelated to a main web page of the other websites. For example, comparison module 106 may determine that the target IP address range including the IP address 109.232.197.33 for the subdomain "a.example.com" is also used in the subdomain "b.test.com," which is associated with the IP address 109.232.197.110, in the website "test.com." Furthermore, comparison module 106 may also determine that the IP address for "b.test.com" is unrelated to an IP address range for the website test.com's main page (e.g., the primary domain).

At step 406, one or more of the systems described herein may then compare the target IP address range to an IP address range utilized by a known third-party web tracker to determine a match. For example, comparison module 106 may, as part of computing device 202 in FIG. 2, compare the target IP address range to IP address ranges associated with third-party web trackers 218.

In some embodiments, comparison module 106 may perform the comparison by checking that the target IP address range is also utilized by a known third-party web tracker domain. For example, the domain "tracker.net" may have been previously identified to be associated with the IP address 109.232.197.21 and thus may be determined to be in the target IP address range identified for the subdomain "a.example.com" which is associated with the address 109.232.197.33.

Returning now to FIG. 3, at step 306 one or more of the systems described herein may determine, based on the comparison performed at step 304, that an IP address range for a target subdomain is potentially utilized by a hidden web tracker as a fake first-party subdomain in a website. For example, determining module 108 may, as part of computing device 202 in FIG. 2, determine that an IP address range 116 for target subdomain 118 (i.e., the target IP address range) is potentially utilized by a hidden web tracker masquerading as a first-party subdomain in a website 208.

Determining module 108 may determine that the target IP address range is potentially utilized by a hidden web tracker in variety of ways. In some embodiments, determining module 108 may make the aforementioned determination based on the results of steps 402-406 performed by comparison module 106 as described above with respect to FIG. 4.

At step 308 one or more of the systems described herein may detect similarities between any scripts loaded by websites associated with the target subdomain and any functions performed by the scripts. For example, detection module 110 may, as part of computing device 202 in FIG. 2, detect similarities between any scripts 124 loaded by websites 208 that are associated with target subdomain 118 as well as any functions performed by scripts 124. Detection module 110 may detect the aforementioned similarities in a variety of ways which will now be described with reference to FIG. 5.

Figure 5:
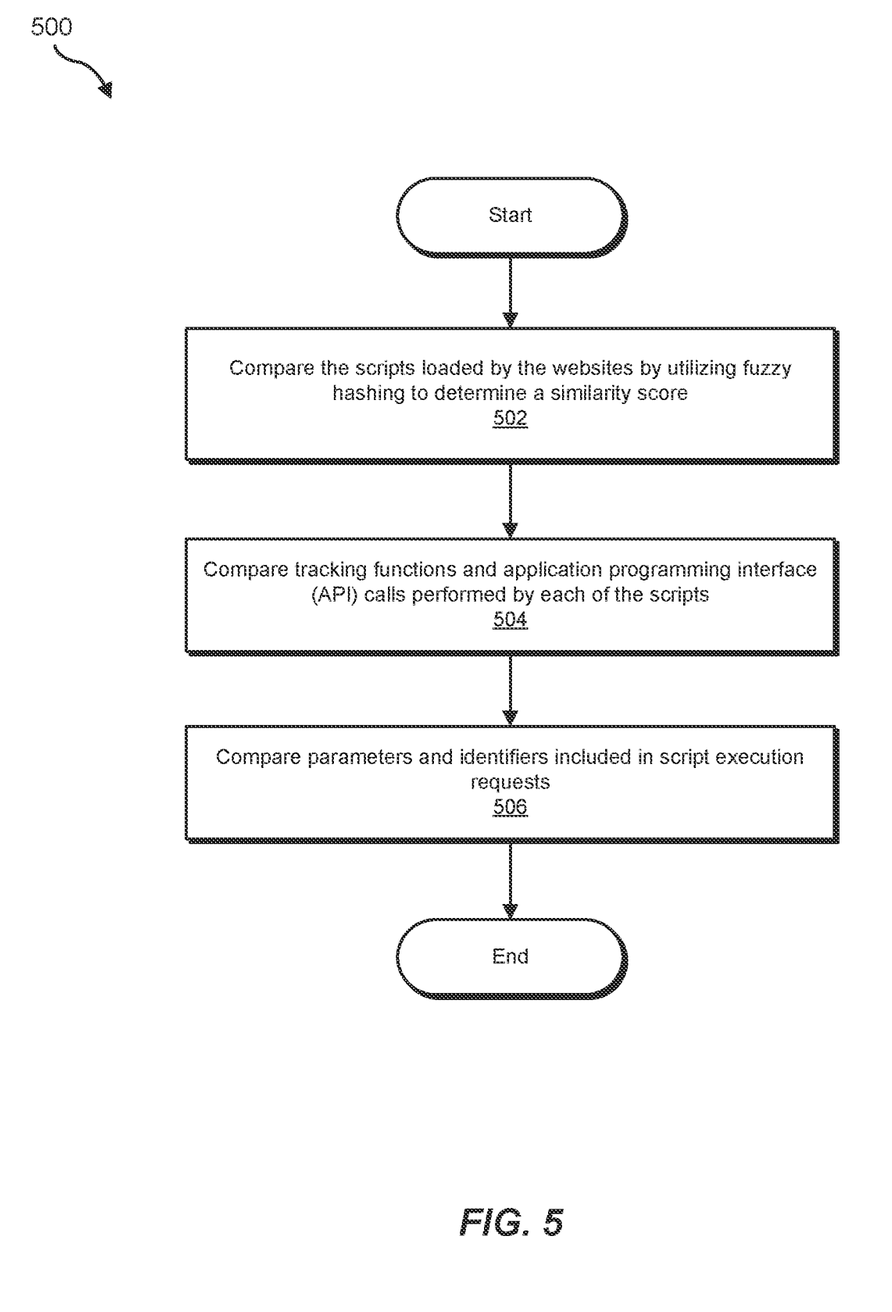
FIG. 5 is a flow diagram of an additional example method for protecting user data privacy against the use of fake first-party domains by hidden web trackers.

Turning now to FIG. 5, a flow diagram of an example computer-implemented method 500 for detecting similarities between any scripts loaded by websites associated with the target subdomain and any functions performed by the scripts, will now be described. The steps shown in FIG. 5 may be performed by any suitable computer-executable code and/or computing system, including system 100 in FIG. 1, system 200 in FIG. 2, and/or variations or combinations of one or more of the same. In one example, each of the steps shown in FIG. 4 may represent an algorithm whose structure includes and/or is represented by multiple sub-steps, examples of which will be provided in greater detail below.

As illustrated in FIG. 5, at step 502 one or more of the systems described herein may compare the scripts loaded by websites associated with a target subdomain by utilizing fuzzy hashing to determine a similarity score. For example, detection module 110 may, as part of computing device 202 in FIG. 2, utilize fuzzy hashing (i.e., a compression function for calculating similarities) to compare scripts 124 loaded by websites 208 (and/or other websites 212) associated with target subdomain 118 to determine a similarity score.

In some embodiments, detection module 110 may compare scripts 124 associated with any subdomains associated with the identified target IP address range as described above with respect to FIG. 4. For example, detection module 110 may, after applying a fuzzy hashing function to a script 124 associated with subdomain "a.example.com" with IP address 109.232.197.33 and another script 124 associated with subdomain "b.test.com" with IP address 109.232.197.110, generate the hash ZoLymAAjaHx/4DpIXYSEAdP0Pn0nxqgeFjviHeFc:KCHOtSinOn-relviNeK for the first subdomain and the hash result asdf-mAAjaHx/4DpIXYSEAdP0Pn0nxqgeFjviVHeFc:asdftSinOnrelviNek for the second subdomain which, based on their comparison, results in a similarity score of 99. Additionally or alternatively, detection module 110 may compare scripts 124 associated with any known third-party web tracker domains associated with the identified target IP address range as described above with respect to FIG. 4. For example, detection module 110 may apply a fuzzy hashing function to a script 124 associated with subdomain "a.example.com" with IP address 109.232.197.33 and another script 124 associated with known third-party web tracking domain "tracker.net" with IP address 109.232.197.21.

At step 504, one or more of the systems described herein may then compare tracking functions and API calls performed by each of the scripts. For example, detection module 110 may, as part of computing device 202 in FIG. 2, compare any tracking functions and API calls (as well as their values) performed by any scripts 124 associated with target subdomain 118 to determine any similarities. For example, detection module 110 may compare tracking functions and API calls (as well as their values) performed by scripts 124 executed by subdomains "a.example.com" and "b.test.com" (which have the same target IP address range) to determine a match (e.g., both subdomains may perform the same tracking functions and API calls).

At step 506, one or more of the systems described herein may then compare parameters and identifiers included in script execution requests. For example, detection module 110 may, as part of computing device 202 in FIG. 2, compare any parameters and identifiers included in script execution requests made by scripts 124. As one example, detection module 110 may compare parameters and identifiers included in script execution requests for subdomains "a.example.com" and "b.test.com" (which have the same target IP address range) to determine similarities (e.g., "a.example.com" may include a.example.com?ukrefid=EE&uidlls=TT and "b.test.com" may include b.test.com?ukrefid=LL&uidlls=SS).

Returning now to FIG. 3, at step 310 one or more of the systems described herein may perform a security action that protects against utilizing fake domains for evading web browser tracking protection by identifying the target subdomain as the fake first-party subdomain based on the similarities detected at step 308. For example, security module 112 may, as part of computing device 202 in FIG. 2, identify target subdomain 118 (e.g., a.example.com) as a fake first-party domain based on its similarities to known third-party web trackers based on steps 304-308, discussed above.

Security module 112 may identify target subdomain 118 as a fake first-party domain in a variety of ways. In some examples, security module 112 may generate a notification that includes fake first-party subdomain identification 126 (i.e., target subdomain 118) in a web browser to alert a user of unauthorized third-party web tracking.

As explained in connection with method 300 above, the systems and methods described herein provide for performing an analysis utilizing a series of checks to identify anomalous IP address ranges associated with first party subdomains in websites. For example, the analysis may include an IP address range phase that includes checking each of a number of different subdomains loaded on a website by comparing the IP address ranges of website pages to identify differences. The IP address range phase may also include comparing the IP address range of any suspicious subdomains (i.e., subdomains having a different IP address range than other IP address ranges for the website) to subdomains of other websites that are unrelated to their main web page. The IP address range phase may additionally include checking if the IP address ranges for the suspicious domains are used by a known third-party web tracker. The analysis may further include a content phase that compares the behavior of scripts loaded by the suspicious subdomains on websites. For example, the content phase may include utilizing fuzzy hashing to detect similarities in scripts loaded by the suspicious subdomains. The content phase may also include checking the different tracking functions and API calls performed by the scripts (along with their values) to identify web tracking activity. The content phase may additionally include checking the different parameters and identifiers that are included when a request to the scripts is made to identify web tracking activity. Based on the IP address range phase and the content phase, the determination that a first party domain is a third-party website tracker may be made.

Figure 6:
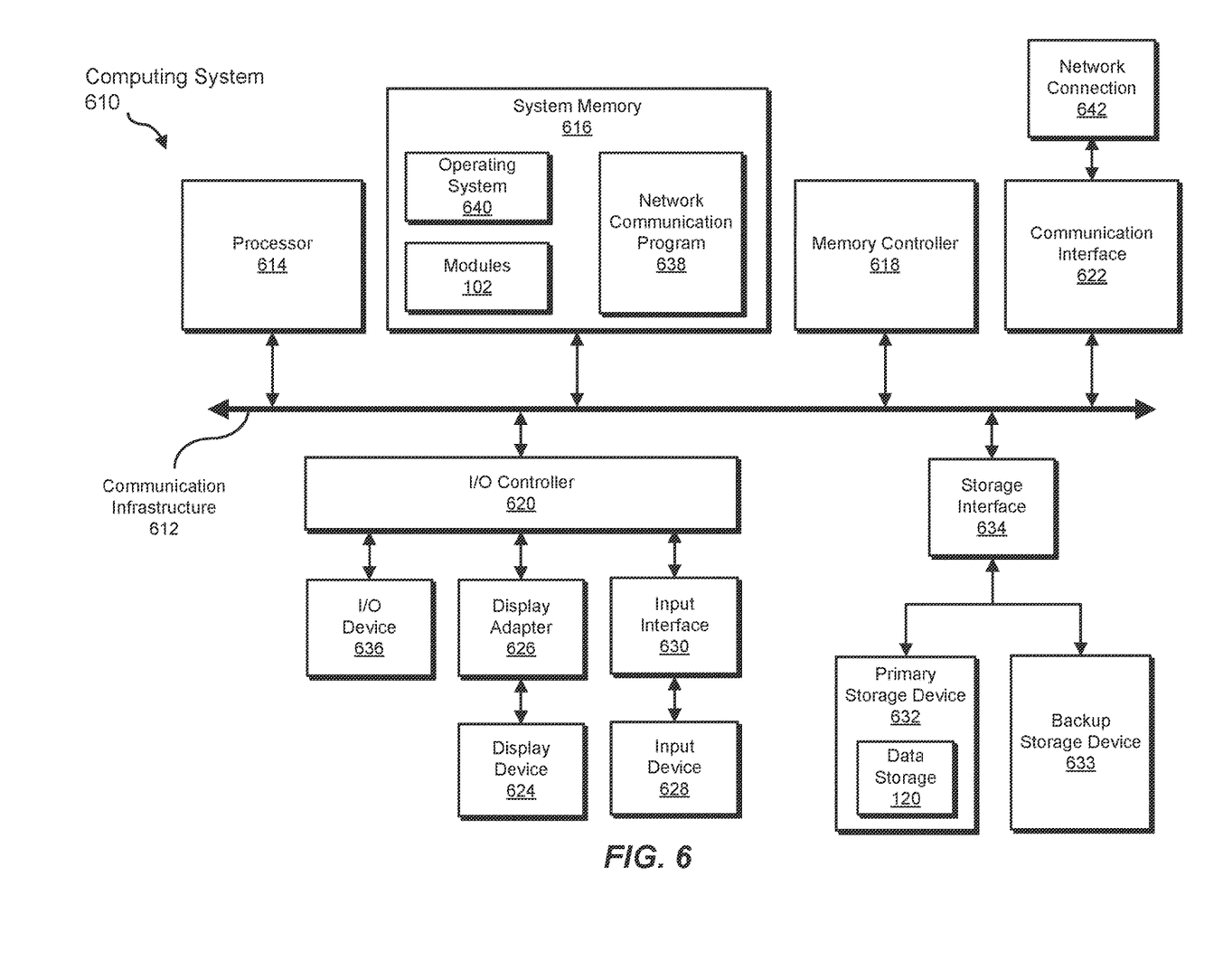
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, data storage 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
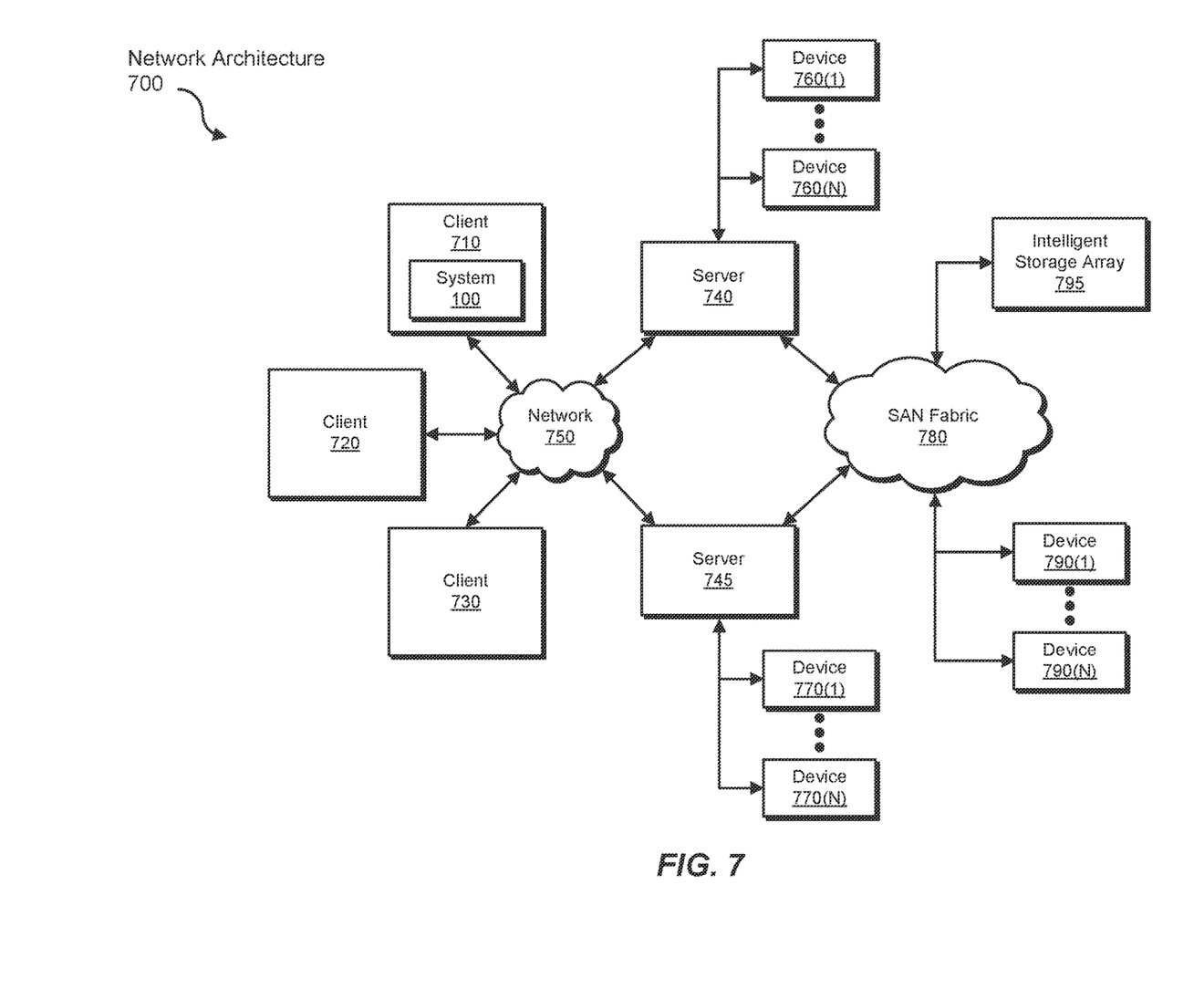
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the present disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for protecting user data privacy against the use of fake first-party domains by hidden web trackers.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for protecting user data privacy against the use of fake first-party domains by hidden web trackers, at least a portion of the method being performed by one or more computing devices comprising at least one processor, the method comprising:
   identifying, by the one or more computing devices, a plurality of subdomains associated with one or more websites;
   comparing, by the one or more computing devices, an Internet Protocol (IP) address range for each of the subdomains;
   determining, by the one or more computing devices and based on the comparison, that an IP address range for a target subdomain is potentially utilized by a hidden web tracker as a fake first-party subdomain in the websites;
   detecting, by the one or more computing devices, similarities between any scripts loaded by websites associated with the target subdomain and any functions performed by the scripts, wherein detecting the similarities comprises:
      applying a fuzzy hashing function to a target subdomain script to generate a first hash result;
      applying the fuzzy hashing function to another subdomain script within the IP address range for the target subdomain to generate a second hash result; and
      comparing the first and second hash results to generate a similarity score; and
   performing, by the one or more computing devices, a security action that protects against utilizing fake domains for evading web browser tracking protection by identifying the target subdomain as the fake first-party subdomain based on the detected similarities.

2. The computer-implemented method of claim 1, wherein identifying the subdomains associated with the websites:
   retrieving a hypertext markup language (HTML) document that renders a currently displayed web page on the websites; and
   identifying the subdomains within HTML code in the HTML document.

3. The computer-implemented method of claim 1, wherein comparing the IP address range for each of the subdomains comprises:
- comparing an IP address range for each of a plurality of web pages on the websites to identify a target IP address range associated with one of the subdomains that is unrelated to other IP address ranges associated with the other subdomains;
- comparing the target IP address range to IP address ranges associated with subdomains for other websites to identify a matching IP address range; and
- comparing the target IP address range to an IP address range utilized by a known third-party web tracker to identify the matching IP address range.

4. The computer-implemented method of claim 3, wherein the IP address ranges associated with the subdomains for the other websites are unrelated to an IP address range for a primary domain associated with each of the other websites.

5. The computer-implemented method of claim 1, wherein the similarities between the scripts loaded by the websites associated with the target subdomain and the functions performed by the scripts are further detected by:
- comparing tracking functions and application programming interface (API) calls performed by each of the scripts; and
- comparing parameters and identifiers included in script execution requests.

6. The computer-implemented method of claim 1, wherein performing the security action that protects against utilizing the fake domains for evading the web browser tracking protection by identifying the target subdomain as the fake first-party subdomain based on the detected similarities comprises:
- determining a high similarity score between a script loaded from a website associated with the target subdomain and scripts from websites associated with other subdomains; and
- determining a similarity between tracking functions and API calls performed by each of the scripts.

7. The computer-implemented method of claim 1, wherein performing the security action that protects against utilizing the fake domains for evading the web browser tracking protection by identifying the target subdomain as the fake first-party subdomain based on the detected similarities comprises:
- determining a high similarity score between a script loaded from a website associated with the target subdomain and scripts from websites associated with other subdomains; and
- determining a similarity between parameters and identifiers included in script execution requests from a website associated with the target subdomain and script execution requests from other websites associated with other subdomains.

8. The computer-implemented method of claim 1, wherein performing the security action that protects against utilizing the fake domains for evading the web browser tracking protection by identifying the target subdomain as the fake first-party subdomain based on the detected similarities comprises:
- determining a similarity between tracking functions and API calls performed by each of the scripts; and
- determining a similarity between parameters and identifiers included in script execution requests from a website associated with the target subdomain and script execution requests from other websites associated with other subdomains.

9. The computer-implemented method of claim 1, wherein performing the security action that protects against utilizing the fake domains for evading the web browser tracking protection by identifying the target subdomain as the fake first-party subdomain based on the detected similarities comprises:
- determining a high similarity score between a script loaded from a website associated with the target subdomain and scripts from websites associated with other subdomains;
- determining a similarity between tracking functions and API calls performed by each of the scripts; and
- determining a similarity between parameters and identifiers included in script execution requests from a website associated with the target subdomain and script execution requests from other websites associated with other subdomains.

10. The computer-implemented method of claim 1, wherein the scripts are executed by web trackers.

11. A system for protecting user data privacy against the use of fake first-party domains by hidden web trackers, the system comprising:
- at least one physical processor;
- physical memory comprising computer-executable instructions and one or more modules that, when executed by the physical processor, cause the physical processor to:
  - identify, by an identification module, a plurality of subdomains associated with one or more websites;
  - compare, by a comparison module, an Internet Protocol (IP) address range for each of the subdomains;
  - determine, by a determining module and based on the comparison, that an IP address range for a target subdomain is potentially utilized by a hidden web tracker as a fake first-party subdomain in the websites;
  - detect, by a detection module, similarities between any scripts loaded by websites associated with the target subdomain and any functions performed by the scripts, wherein the detection module detects the similarities by:
    - applying a fuzzy hashing function to a target subdomain script to generate a first hash result;
    - applying the fuzzy hashing function to another subdomain script within the IP address range for the target subdomain to generate a second hash result; and
    - comparing the first and second hash results to generate a similarity score; and
  - perform, by a security module, a security action that protects against utilizing fake domains for evading web browser tracking protection by identifying the target subdomain as the fake first-party subdomain based on the detected similarities.

12. The system of claim 11, wherein the identification module identifies the subdomains associated with the websites by:
- retrieving a hypertext markup language (HTML) document that renders a currently displayed web page on the websites; and
- identifying the subdomains within HTML code in the HTML document.

13. The system of claim 11, wherein the comparison module compares the IP address range for each of the subdomains by:

comparing an IP address range for each of a plurality of web pages on the websites to identify a target IP address range associated with one of the subdomains that is unrelated to other IP address ranges associated with the other subdomains;

comparing the target IP address range to IP address ranges associated with subdomains for other websites to identify a matching IP address range; and comparing the target IP address range to an IP address range utilized by a known third-party web tracker to identify the matching IP address range.

14. The system of claim 13, wherein the IP address ranges associated with the subdomains for the other websites are unrelated to an IP address range for a primary domain associated with each of the other websites.

15. The system of claim 13, wherein the detection module further detects the similarities between the scripts loaded by the websites associated with the target subdomain and the functions performed by the scripts by:

comparing tracking functions and application programming interface (API) calls performed by each of the scripts; and comparing parameters and identifiers included in script execution requests.

16. The system of claim 11, wherein the security module performs the security action that protects against utilizing the fake domains for evading the web browser tracking protection by identifying the target subdomain as the fake first-party subdomain based on the detected similarities by:

determining a high similarity score between a script loaded from a website associated with the target subdomain and scripts from websites associated with other subdomains; and determining a similarity between tracking functions and API calls performed by each of the scripts.

17. The system of claim 11, wherein the security module performs the security action that protects against utilizing the fake domains for evading the web browser tracking protection by identifying the target subdomain as the fake first-party subdomain based on the detected similarities by:

determining a high similarity score between a script loaded from a website associated with the target subdomain and scripts from websites associated with other subdomains; and determining a similarity between parameters and identifiers included in script execution requests from a website associated with the target subdomain and script execution requests from other websites associated with other subdomains.

18. The system of claim 11, wherein the security module performs the security action that protects against utilizing the fake domains for evading the web browser tracking protection by identifying the target subdomain as the fake first-party subdomain based on the detected similarities by:

determining a similarity between tracking functions and API calls performed by each of the scripts; and determining a similarity between parameters and identifiers included in script execution requests from a website associated with the target subdomain and script execution requests from other websites associated with other subdomains.

19. The system of claim 11, wherein the security module performs the security action that protects against utilizing the fake domains for evading the web browser tracking protection by identifying the target subdomain as the fake first-party subdomain based on the detected similarities by:

determining a high similarity score between a script loaded from a website associated with the target subdomain and scripts from websites associated with other subdomains;

determining a similarity between tracking functions and API calls performed by each of the scripts; and determining a similarity between parameters and identifiers included in script execution requests from a website associated with the target subdomain and script execution requests from other websites associated with other subdomains.

20. A non-transitory computer-readable medium comprising one or more computer-executable instructions that, when executed by at least one processor of a computing device, cause the computing device to:

identify a plurality of subdomains associated with one or more websites;

compare an Internet Protocol (IP) address range for each of the subdomains;

determine, based on the comparison, that an IP address range for a target subdomain is potentially utilized by a hidden web tracker as a fake first-party subdomain in the websites;

detect similarities between any scripts loaded by websites associated with the target subdomain and any functions performed by the scripts, wherein the similarities are detected by:

applying a fuzzy hashing function to a target subdomain script to generate a first hash result;

applying the fuzzy hashing function to another subdomain script within the IP address range for the target subdomain to generate a second hash result; and comparing the first and second hash results to generate a similarity score; and perform a security action that protects against utilizing fake domains for evading web browser tracking protection by identifying the target subdomain as the fake first-party subdomain based on the detected similarities.

* * * * *